United States Patent Office.

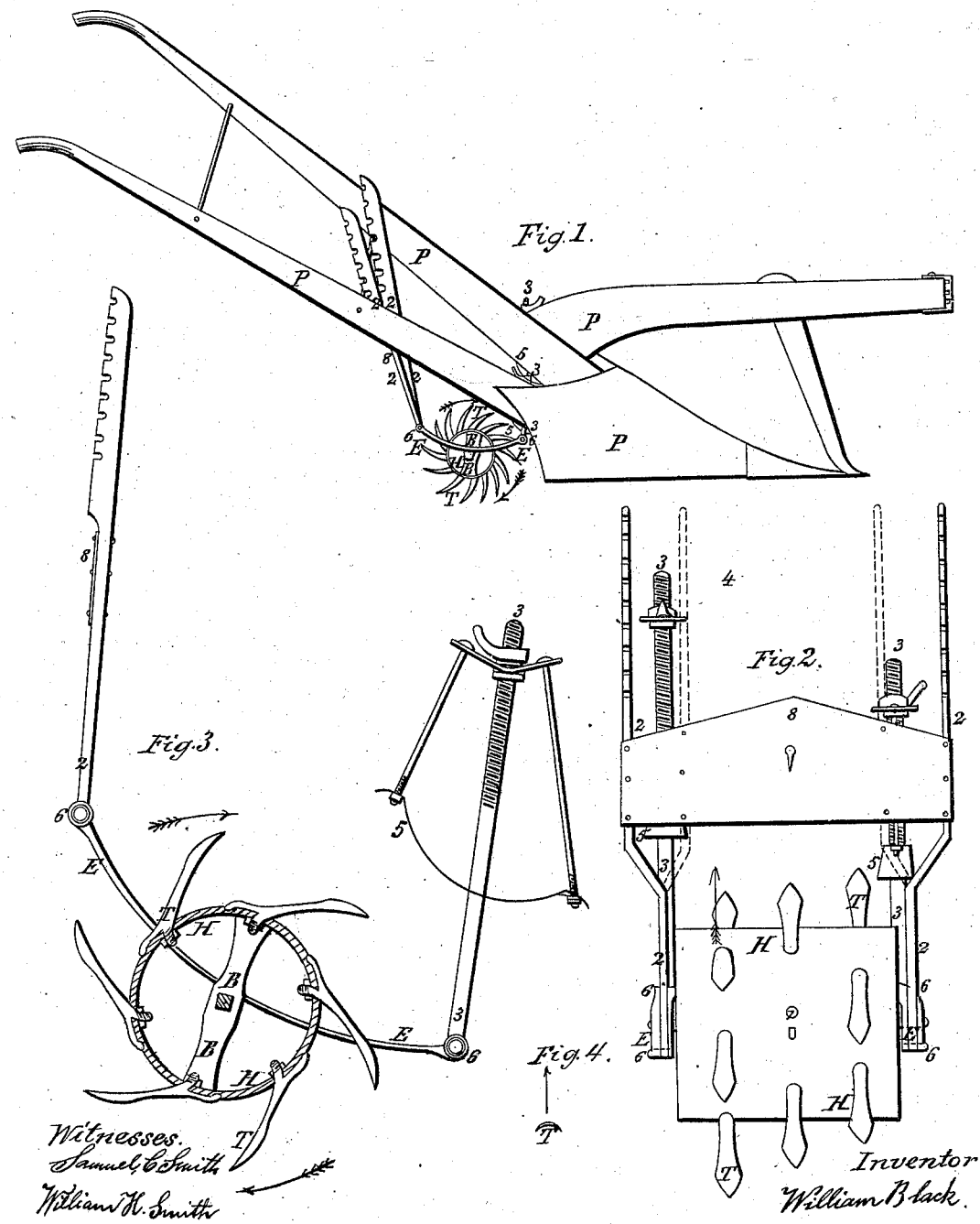

WILLIAM BLACK, OF MANCHESTER, PENNSYLVANIA.

IMPROVEMENT IN PLOWS.

Specification forming part of Letters Patent No. 21,182, dated August 17, 1858.

*To all whom it may concern:*

Be it known that I, WILLIAM BLACK, of the borough of Manchester, in the county of Allegheny, in the State of Pennsylvania, have invented a new and useful Improvement in Plows; and I do hereby declare that the following is a full, clear, and exact description of the construction and operation of the same, reference being had to the accompanying drawings, and to the letters and numbers of reference marked thereon, making a part of this specification.

The nature of my invention consists in attaching to and using with plows that are used for surface-furrow plowing an adjustable revolving or rotary subsoil-digger to dig and loosen the subsoil that is under the bottom of the furrow made by the plow, at the same time and by the same team that the surface-plowing is done, which digger is to have its axis horizontal at or near a right angle to the landside and its axle in journal-bearings that will yield upward if the digger should strike a stone or other hard substance in the subsoil. This digger is to rotate behind the mold-board in the rear of the landside of the plow, so as to dig and loosen the subsoil immediately after the plow has turned the furrow-slice of surface-soil out of the way of the digger.

To enable others skilled in the art to make and use my invention, I will proceed to describe its construction and operation, and in so doing I will refer to the above-mentioned drawings, in which—

Figure 1 is a perspective view of a plow with the subsoil-digger attached. Fig. 2 is a longitudinal elevation of the digger, with its adjusting-rods, braces, and running-gear, on a larger scale detached from the plow. Fig. 3 is a section of Fig. 2, in line 4 4. Fig. 4 is a transverse section of the teeth or picks of the digger near their points.

The same letters and numbers of reference denote like parts in each figure.

P P denote a furrow-plow; H H, the subsoil-digger; T T, the teeth or picks of the digger; E E, the pressure-springs, to which the journal-bearings of the digger are fastened; B B, braces, that strengthen the digger, and in which the axle of the digger is fastened; 3 3, screw-rods for fastening the digger to the plow and adjusting its fore side; 2 2, hooked rods, for adjusting and fastening the digger at its hind side to the rung or round that stretches between the two handles of the plow; 8, a dash-board, to keep the mud or water that the digger may throw from annoying the plowman and likewise brace the adjusting-rods 2 2; 5 5, braces to keep steady the rods 3 3 near their lower end; 1, (see Fig. 2,) holes in which the teeth or picks of the digger are inserted and fastened; 6 6, hinged or other flexible joints, that connect the springs E E with the adjusting-rods 2 2 and 3 3 at their lower end.

I make the drum or periphery of the digger shorter than the width of the furrow it is intended to dig, so as it may run clear of the sides of the furrow, and I make it large enough in diameter to give room to fasten or unfasten the teeth or picks, which teeth or picks are fastened to the digger through the holes 1 by nuts screwed on them, and they have heels let into the drum or periphery of the digger on its outside, so as to strengthen them, and are distributed around the periphery of the digger in such a manner that only one tooth or pick will strike the surface of the subsoil at one and the same time, and I curve them so that they will strike the subsoil at or near a right angle to its surface. The braces B B are fastened to the ends of the drum, and have holes for the axle of the digger to pass through them at its center.

The pressure-springs E E have journal-bearings on their lower side about the middle of their length, for the axle of the digger to run in, and they are hinged to the adjusting-rods 3 3 and 2 2 at 6 6. The adjusting-rods 3 3 are hinged to the fore end of the springs, and pass through the braces 5 5 freely and up through the fore end of the handles of the plow, as seen at Fig. 1, and are adjusted by set-nuts or other suitable devices. The adjusting-rods 2 2 are hinged to the hind end of the springs, and have a dash-board or brace near their lower end, and have a number of notches or hooks near their upper end, for the purpose of fastening to the rung or round that stretches between the two handles of the plow. The pressure-springs should be made of steel. The teeth or picks may be made of steel or of iron, and have steel points, which points should be made sharp and of such shape as will enter the soil they are intended to dig with the least pressure, provided they have sufficient strength. I prefer them rounding on point and hollowing in back transversely near the point, as seen in Fig. 4.

The rods, braces, dash-board, and digger may be made of wrought-iron or other suitable metal. The digger may be made of various sizes and have such number of teeth or picks as will suit different kinds of land. I prefer them with many teeth or picks, so that I can take some out or put some in, as the nature of the soil may require. The digger may be attached to and used with furrow-plows that are already made, and the adjusting-rods may be bent to fit between the handles, (see dotted lines in Fig. 2;) but I prefer the plows to have longer handles than are generally used, so that the plowman can have more power to bear down the digger, and I bend the handle of the landside of the plow out, so as to give room for the digger to work in the center of the furrow made by the plow. I bend the pressure-springs inward in front of the digger, so as to bring the digger as near the heel of the landside and mold-board of the plow as its free action will admit of.

The operation of this digger is: When the digger is adjusted in its place, and to the depth of cut that the nature of the soil and the strength of the team will admit of, by the rods 3 3 at its fore side and by the rods 2 2 at its hind side, if the plow be started, as it advances the digger will follow, revolving, as indicated by the arrows, (see drawings,) and the teeth or picks will be pressed into the subsoil by the weight of the plow and by the plowman, and dig and loosen the bottom of the furrow transversely. If the teeth or picks of the digger should strike suddenly any hard substance in the subsoil, the pressure-springs will yield upward. The joints 6 6, being flexible, will allow the rods 2 2 to move backward or forward, as the pressure on the springs may require, and the rods 2 2 may be hooked up, so as to keep the digger teeth or picks clear of the bottom of the furrow that the plow makes, when desired, and by unscrewing the rods 3 3 and unhooking the rods 2 2 the digger may be detached from the plow and the plow used without the digger at work that does not require or admit of its use.

I have contemplated making the teeth or picks of the digger so that they could be fastened into the digger by keys, and have two or more holes for keys at different distances from their point, so that they can be made to dig deeper or shallower by changing the keys into different holes.

Having thus fully described the manner in which I construct my plow and its subsoil-digger, I do hereby declare that I do not claim either of the individual parts thereof; nor do I claim the precise form of the digger teeth or picks shown and described, as similar ones may be seen in a patent granted E. F. Berry February 19, 1856; nor do I wish to be understood as limiting my claim to the precise arrangement shown and described of the springs E, joints 6, rods 2 and 3, with the plow P and digger H, as that is susceptible of various modifications; but

What I do claim is—

The combining with the plow P the adjustable rotary digger H, having sharp teeth or picks T, substantially as hereinabove described, for the purpose set forth.

WILLIAM BLACK.

Attest:
SAMUEL C. SMITH,
WILLIAM H. SMITH.